Patented Mar. 22, 1949

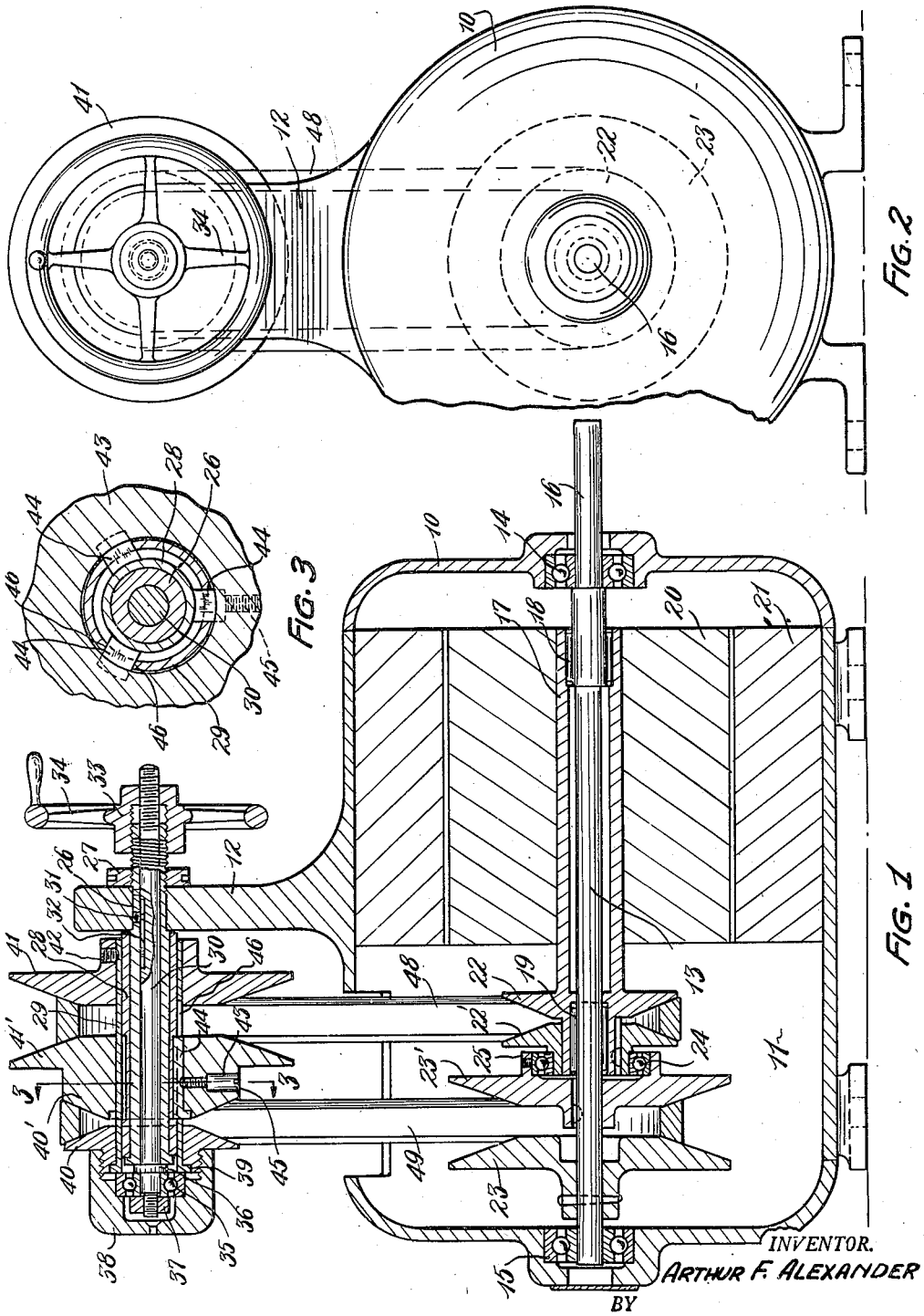

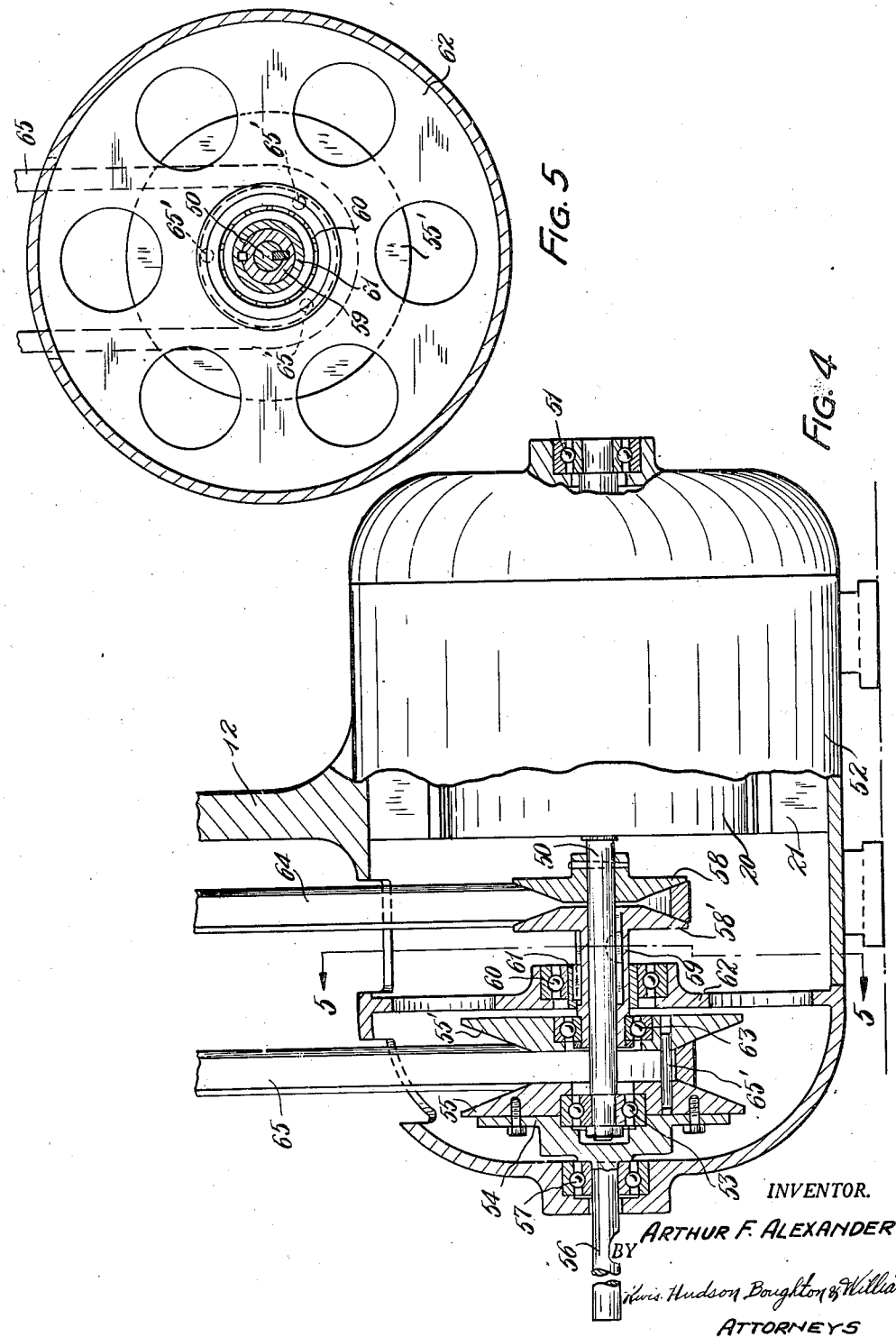

2,464,841

UNITED STATES PATENT OFFICE 2,464,841

VARIABLE TRANSMISSION

Arthur F. Alexander, Cleveland, Ohio

Application March 15, 1944, Serial No. 526,508

2 Claims. (Cl. 74—230.17)

This invention relates to improvements in variable transmissions, more particularly variable speed belt drives. It has to do with expansible split V pulleys and means for adjusting them to obtain varying speed ratios.

One of the objects of the invention is the provision of drives of the character stated which shall be readily adaptable for assembly upon the housings of electric motors, whereby a complete variable speed power assembly may be manufactured and sold ready for installation as a unit.

Another object of the invention is the provision of variable speed transmissions of the character stated which shall be susceptible of a multiplicity of different speeds.

Another object is the provision of a transmission of the character stated in which speed changes may be effected during the operation of the transmission.

Other objects and features of novelty will appear as I proceed with the description of those embodiments of the invention which, for the purposes of the present application, I have illustrated in the accompanying drawings, in which, Fig. 1 is a longitudinal, vertical, sectional view through a motor and transmission unit embodying the invention.

Fig. 2 is an end view of the same.

Fig. 3 is a detail sectional view taken substantially on the line 3—3 of Fig. 1 showing the parts on a larger scale.

Fig. 4 is a fragmentary longitudinal, vertical, sectional view showing a modified arrangement of input and output shafts with their associated pulleys, and Fig. 5 is a sectional view taken substantially on the line 5—5 of Fig. 4.

Referring first to Figs. 1, 2 and 3: 10 represents a motor housing enlarged to provide in one end thereof a cavity 11 for the reception of certain parts of a variable speed belt drive. The housing includes further an integral upwardly projecting standard 12 for the support of a countershaft, later to be described.

13 is a power shaft which is mounted in anti-friction bearings 14 and 15 carried in the ends of the housing. This shaft has a portion 16 projecting from one end of the housing and providing convenient means for delivering power from the unit in substantially the same relative location as would be afforded by a conventional electric motor.

Surrounding the shaft 13 there is a sleeve or hollow shaft 17 which is rotatably supported upon the shaft 13 through the intermediacy of suitable bearings, such as the needle bearings 18 and 19 herein illustrated. Hollow shaft 17 carries the rotor 20 of the motor which turns within the motor stator 21. For the sake of simplicity in illustration these latter parts are merely indicated as to position and the electric connections are omitted.

The hollow shaft 17 carries an expansible split V pulley comprising a section 22 which may be integral with the hollow shaft and a section 22' which is slidably keyed to the hollow shaft, so that the sections 22, 22' rotate together and are relatively slidable axially of the sleeve. 23 and 23' are sections of another expansible split V pulley carried directly by the shaft 13, the section 23 being pinned to the shaft as shown, while the section 23' is slidably keyed to the shaft for movement toward or away from the section 23.

Sections 22' and 23' are relatively rotatable, but they are secured together in so far as axial movement is concerned, that is to say, the inner race of an anti-friction bearing 24 is pressed on to the hub of section 22', and the outer race of the same bearing is held within a circular cavity on one side of section 23' by set screws 25 or the like. Hollow shaft 17 carrying pulley 22, 22' constitutes the input shaft of the transmission and shaft 13, 16 carrying pulley 23, 23' constitutes the output shaft of the unit.

Standard 12 has a hole therethrough within which the reduced right hand portion of a hollow spindle 26 fits snugly. Any suitable means may be provided for adjusting the hollow spindle 26 toward and away from shaft 13 and sleeve 17 in order to regulate belt tension. The right hand end of this spindle 26 is threaded and receives a nut 27 which is screwed tightly against a surface of standard 12, bringing the shoulder between the main and the reduced portions of the spindle up against the opposite surface of the standard thereby rigidly attaching the spindle to the standard. A bronze bushing 28 is mounted to turn freely upon the spindle 26, and a sleeve 29 surrounds bushing 28 and turns with it, as will presently appear.

A stem 30 fits within hollow spindle 26, being shiftable axially of the spindle but held against rotation by a pin 31 which projects from the spindle into a longitudinal groove 32 in the stem. Longitudinal movement of stem 30 is employed to effect changes in speed ratios. Any suitable means may be employed to produce such longitudinal movement. The illustrated means comprises a left hand thread upon the exposed extremity of stem 30 and a compound nut 33 having portions threadably engaging both the right hand thread on the spindle 26 and the left hand thread on the stem 30. Nut 33 may be formed as an integral part of hand wheel 34 which, when turned in one direction or the other, will move the stem 30 toward the right or the left as may be desired.

The inner race of an anti-friction bearing 35 is clamped between a collar 36 on the stem and a nut 37. The outer race of this bearing is clamped between a cap 38 and an end flange 39 on sleeve 29. Cap 38 is threaded onto the hub of one section 40 of an expansible split V pulley which is recessed to receive flange 39. When cap 38 is screwed down tightly therefore it locks pulley section 40 to sleeve 29. At the opposite end of that sleeve the hub of one section 41 of another expansible split V pulley is secured to the sleeve 29 by a set screw 42. Hence, these pulley sections 40 and 41 are locked together against relative rotation and relative axial movement.

An intermediate pulley element 43 embodies pulley sections 40' and 41', cooperating with sections 40 and 41 respectively. Element 43 rotates with sections 40 and 41 but cannot move axially as can those sections. Three segments 44 are disposed at 120° intervals in an annular recess of bushing 28. The element 43 is pressed onto these segments which thereby constitute securing means between the bushing and the pulley element. A set screw 45 may be employed as additional means for locking the pulley element to one of the segments 44. Element 43 thus rotates with the bushing and is locked against movement axially thereof. Segments 44 extend through slots 46 in the sleeve 29. Hence, the latter sleeve is free to move axially with respect to these segments. A V belt 48 runs over pulley 22, 22' and pulley 41, 41'. Another V belt 49 runs over pulley 23, 23' and pulley 40, 40'.

Regarding the operation of the invention as illustrated in Figs. 1, 2 and 3 it will be apparent that while the motor is running the operator may turn wheel 34 to cause stem 30 to move from the illustrated position toward the left. This will cause pulley sections 41 to approach pulley section 41' and at the same time will cause pulley section 40 to move away from pulley section 40'. The effective diameter of pulley 41, 41' will thereby be increased, and the effective diameter of pulley 40, 40' will be correspondingly decreased. When this occurs camming force will be exerted by belt 48 tending to separate pulley sections 22, 22', and this force will be communicated through the bearing 24 to pulley section 23' tending to move it toward pulley section 23. This latter effect will not be opposed by belt 49 because the opening of pulley 40, 40' will provide an increased portion of the length of belt 49 for travel around the increased diameter of pulley 23, 23'.

With the pulley proportions illustrated herein there will be a material reduction in speed as between hollow input shaft 17 and output shaft 13, 16 in all positions of the control mechanism but as the stem 30 is drawn toward the right speed reductions will be varied gradually through an infinite number of ratios until pulley sections 41, 41' and 23, 23' come together. Obviously the speeds of output shaft 13, 16 may be made higher than those of the hollow input shaft by changing the relative dimensions of the pulleys, and if desired, variations both upwardly and downwardly from motor speed may be obtained if the pulley dimensions are made all alike or substantially so. In every instance pulley 22, 22' should be of the same dimensions as pulley 40, 40', and similarly the dimensions of pulley 23, 23' and 41, 41' should be the same, that is, in order that the belts 48, 49 may remain taut throughout the range of adjustments.

In Figs. 4 and 5 I have illustrated a slightly modified form of shaft and pulley arrangement for the input and output parts of the unit. In principle and operation it is like the first form. The rotor 20 of the motor is mounted directly upon the input shaft 50 which is carried at one end in an anti-friction bearing 51 in the motor housing 52. The opposite end of shaft 50 is secured to the inner race of an anti-friction bearing 53, the outer race of which is clamped between a spider 54 and one section 55 of an expansible split V pulley. Spider 54 is carried at the inner end of an output shaft 56, which is mounted in an anti-friction bearing 57 carried by the housing in alignment with bearing 51. The aligned shafts 50 and 56 are therefore independently rotatable.

A section 58 of an expansible split V pulley has its hub pinned to shaft 50. The other section 58' of this pulley has a long hub 59 which is slidably keyed to shaft 50. This hub 59 is mounted to slide within the inner race of an anti-friction bearing 60, a sleeve 61 being preferably interposed between the bearing and the hub 59 and slidably keyed to the latter. The outer race of this bearing is mounted in an internal wall 62 of the housing. Bearing 60 forms the principal support for the left end of shaft 50, while through bearing 53 the two shafts 50 and 56 help to mutually steady and support each other.

The left end of hub 59 carries the inner race of an anti-friction bearing 63, the outer race of which is pressed into a recess in pulley section 55'. Bearing 63 locks pulley sections 55' and 58' together against relative axial movement while permitting them to rotate independently of each other, just as in the case of pulley sections 22' and 23' previously described. A V belt 64 runs over pulley 58, 58' and a V belt 65 runs over pulley 55, 55', it being understood that these belts cooperate with expansible split V pulleys on a countershaft, not shown, in the same manner as illustrated at Fig. 1. In order that there may be no relative motion between pulley sections 55 and 55' I provide a plurality of pins 65' evenly spaced and slidable in one or the other or both of the sections. Thus I provide drive from section 55 to section 55' in all conditions of adjustment of these sections. The method of operation of this form of the invention may be identical with that of Figs. 1 to 3.

I claim:
1. In mechanism of the character described, a housing, a motor rotor therein, a set of two independently rotatable input and output split V pulleys coaxial with said rotor, having bearing upon said housing, the adjacent sections of the said pulleys being locked together for axial movement, a countershaft, a support therefor rigid with respect to said housing, a set of two split V pulleys on said countershaft, a sleeve surrounding said countershaft extending axially through the inner pulley sections on said shaft and connecting together the outer sections on said shaft for conjoint axial and rotational movement, V belts running over the corresponding pulleys of the two sets, and manually operable means extending through said sleeve for axially moving said sleeve on said countershaft independently of the inner pulley sections on that shaft.

2. In mechanism of the character described, a motor, a rotor therefor, a set of two independently rotatable input and output split V pulleys coaxial with said rotor, the adjacent sections of said pulleys being locked together for conjoint axial movement, a countershaft comprising a hollow spindle, a support for one end thereof, a set of two split V pulleys rotatable together upon said countershaft, means for connecting together the outer sections of said countershaft pulleys for conjoint axial movement independently of the inner sections of those pulleys, V belts running over the corresponding pulleys of the two sets, an operating rod extending through said hollow spindle and connected with the pulley section at the free end of said spindle, and manual means at the supported end of said spindle for moving said rod longitudinally in either direction.

ARTHUR F. ALEXANDER.

REFERENCES CITED

The following references are of record in the file of this patent:

UNITED STATES PATENTS

| Number | Name | Date |
|---|---|---|
| 2,179,053 | Reeves | Nov. 7, 1939 |
| 2,207,073 | Shields | July 9, 1940 |
| 2,248,948 | Bowers | July 15, 1941 |
| 2,293,617 | Myers | Aug. 18, 1942 |
| 2,342,604 | Shaw | Feb. 22, 1944 |
| 2,348,940 | Voegeli | May 16, 1944 |
| 2,351,148 | Rafter | June 13, 1944 |